United States Patent
Turbin

(10) Patent No.: US 9,134,996 B2
(45) Date of Patent: Sep. 15, 2015

(54) UPDATING ANTI-VIRUS SOFTWARE

(75) Inventor: Pavel Turbin, Jokela (FI)

(73) Assignee: F-Secure Corporation, Helsinki (FI)

(*) Notice: Subject to any disclaimer, the term of this patent is extended or adjusted under 35 U.S.C. 154(b) by 394 days.

(21) Appl. No.: 13/066,977

(22) Filed: Apr. 28, 2011

(65) Prior Publication Data

US 2012/0278892 A1   Nov. 1, 2012

(51) Int. Cl.
*G08B 23/00* (2006.01)
*G06F 9/445* (2006.01)
*G06F 21/53* (2013.01)
*G06F 21/56* (2013.01)

(52) U.S. Cl.
CPC ........ *G06F 8/67* (2013.01); *G06F 21/53* (2013.01); *G06F 21/566* (2013.01)

(58) Field of Classification Search
None
See application file for complete search history.

(56) References Cited

U.S. PATENT DOCUMENTS

| 7,086,090 B1 * | 8/2006 | Dawson et al. ............... 726/24 |
| 2003/0204833 A1 * | 10/2003 | Pokhariyal ................... 717/106 |
| 2009/0282485 A1 * | 11/2009 | Bennett ........................ 726/24 |

FOREIGN PATENT DOCUMENTS

| EP | 1 585 350 A1 | 10/2005 |
| WO | WO-94/01819 A1 | 1/1994 |

* cited by examiner

*Primary Examiner* — Brandon Hoffman
(74) *Attorney, Agent, or Firm* — Harrington & Smith

(57) ABSTRACT

A method of updating an anti-virus application including an updatable module running on a client terminal. The method includes receiving an update at the client terminal, initializing the updatable module within a sandbox environment and applying the update to the updatable module. Control tests are then run on the updated sandboxed module and if the control tests are passed, the updated module is brought out of the sandbox environment and normal scanning is allowed to proceed using the updated module. If the control tests are not passed, however, normal scanning using the updated module is prevented.

18 Claims, 2 Drawing Sheets

UPDATING ANTI-VIRUS SOFTWARE

TECHNICAL FIELD

The present invention relates to the updating of anti-virus software on a computer. In particular, though not necessarily, the present invention is concerned with ensuring stability of the computer during or following such updating.

BACKGROUND

This section is intended to provide background or context to the invention recited in the claims. The description of the background art may include insights, discoveries, understandings or disclosures, or associations of disclosures not known in the prior art. Some contributions of the invention may be specifically pointed out below, whereas other contributions of the invention will be apparent from their context.

The term "malware" is short for malicious software and is used to refer to any software designed to infiltrate or damage a computer system without the owner's informed consent. Malware can include viruses, worms, trojan horses, rootkits, adware, spyware and any other malicious and unwanted software. Many computer devices, such as desktop personal computers (PCs), laptops, personal data assistants (PDAs) and mobile phones can be at risk from malware.

Detecting malware is often challenging, as malware may be designed to be difficult to detect, often employing technologies that deliberately hide the presence of malware on a system. For example a malware application may not show up on the operating system tables that list currently-running processes on a computer.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

New malware is constantly being created and therefore regular updates to the anti-virus software are essential. In addition to updating the virus signatures, improvements to the software and its components are also distributed to end users, via the web, which ensure that the software runs efficiently and benefits from any software enhancements that may have been developed. Anti-virus software will typically contain a number of modules that are updatable, for example the scanning engine, parts of the scanning logic, drivers and UI components. Every week, anti-virus software will typically receive hundreds of updated components, including new signatures, configuration data and software components. Once the supplier of the anti-virus software has identified a new piece of malware, it is important that an update is sent out quickly to end users so that their computer systems are protected from an attack from said malware.

Due to the short timeframe and tight update schedule that is required, there is a significant chance that a given update may contain errors, and quality assurance is not always perfect. This is compounded by the fact that anti-virus software is used by a very large number of end users using many different computer system configurations. As such, anti-virus software will be expected to perform correctly on computer systems with different operating systems, language localizations, different installed components and so on. This makes it very hard to recreate or model exactly the same configuration in testing as that running on end-user computer systems.

Each update that is sent out to end users can potentially cause instability in the anti-virus software running on their computer systems. Furthermore, due to the high level requirements of anti-virus software (i.e. the detection and removal of potentially harmful installed components), it typically runs at a high system level and so any problems with the anti-virus software, due to a faulty update for example, can cause severe disruptions to a user's computer system. Examples of common issues arising from problem updates are stability problems due to the received update not being compatible with one or more current components in the software causing the computer system to crash, "hanging" during virus scanning or very lengthy scan times, losing malware detection and/or clean up function entirely, or the engine returning false positives caused by the an update.

The problems mentioned above can be particularly severe if they are in relation to common system files. For example if a crash occurs during scanning of an operating system file, or if such a file was returned as a false positive then this could potentially lead to a problem that is so severe that the computer system no longer functions correctly. Another major concern is that a problem update locks down the anti-virus software and it becomes impossible to provide an automatic update fix, requiring a complete re-installation of the software.

SUMMARY

It is an object of the present invention to overcome the problems discussed above and which result from updates to anti-virus software. This object is achieved by providing a sandbox environment that mirrors the main anti-virus environment into which the updatable module can be loaded and the update applied. The stability of the update can then be tested before the module is brought out of the sandbox environment and into normal usage.

According to a first aspect of the invention there is provided a method of updating an anti-virus application comprising an updatable module running on a client terminal. The method comprises receiving an update at the client terminal, initialising the updatable module within a sandbox environment and applying the update to the updatable module. Control tests are then run on the updated sandboxed module and if the control tests are passed, the updated module is brought out of the sandbox environment and normal scanning is allowed to proceed using the updated module. If the control tests are not passed, however, normal scanning using the updated module is prevented.

Embodiments of the present invention may provide an improved method of updating anti-virus software on a client computer. Embodiments of the current invention may also provide a method of reducing the undesirable effects that problem updates can have on a client computer.

The updatable module may be a scanning engine.

The sandbox environment may be a sandboxed instance of a scanning process of the anti-virus application and may be implemented as a runner process with reduced functionality, a forked, or cloned, instance of the main scanning process, but with disabled functionality, or a reduced form of the main scanning process where the engine is run in a transparent mode.

The sandboxed module may be made to perform multiple cycles of initializations with different configuration parameters.

A control test may comprise scanning a selection of known clean and/or malicious files to confirm that the updated module is functioning correctly. The selection of known clean and/or malicious files may comprise one or more of operating system files, anti-virus application files, previous N-scanned files, user documents, locally fuzzed files and predefined files.

A control test may include checking that standard module processes do not cause an application or system crash and may include checking that standard module processes do not cause CPU and/or memory spikes.

If the control tests are not passed, an alert may be sent from the client terminal to a server of an anti-virus application provider, the alert providing details of the failed control test(s).

According to a second aspect of the invention, there is provided a method of scanning a client terminal for malware using an anti-virus application comprising an updated module. The method comprises scanning the client terminal for potential malware and upon detection of potential malware initialising the updated module within a sandbox environment and running control tests on the sandboxed updated module. If the control tests are passed, the detection of the potential malware is confirmed and if the control tests are not passed, either the detection is rejected or further tests are performed on the potential malware.

According to a third aspect of the invention, there is provided a client terminal comprising a scanning engine for detecting malware on the client terminal, an update handler for receiving updates for the scanning engine, a sandbox environment in which the scanning engine can be initialised when it is to be updated, and a testing handler for testing that the updated scanning engine functions correctly within the sandbox environment.

The testing handler may be configured to test the updated scanning engine using known clean and/or malware files.

According to a fourth aspect of the invention, there is provided a computer program product comprising a computer-readable medium bearing computer program code embodied therein for use with a computer. The computer program code comprises code for receiving an update at the client terminal, code for initialising an updatable module of an anti-virus application within a sandbox environment and applying the update to the updatable module, code for running control tests on the updated sandboxed module, and code for bringing the updated module out of the sandbox environment and allowing normal scanning to proceed using the updated module when the control tests are passed and code for preventing normal scanning using the updated module when the control tests are not passed, The sandbox environment may be a sandboxed instance of a scanning process of the anti-virus application and the computer program code may further comprise code for implementing the sandboxed instance of the scanning process in at least one of the following ways: as a runner process with reduced functionality; as a forked, or cloned, instance of the main scanning process, but with disabled functionality; or as a reduced form of the main scanning process where the engine is run in a transparent mode.

The computer program product may further comprise code for performing multiple cycles of initializations of the sandboxed module with different configuration parameters.

The code for running control tests may run control tests comprising at least one of the following: scanning a selection of known clean and/or malicious files to confirm that the updated module is functioning correctly; checking that standard module processes do not cause an application or system crash; checking that standard module processes do not cause CPU and/or memory spikes.

The computer program product may further comprise code for sending an alert from the client terminal to a server of an anti-virus application provider if the control tests are not passed, the alert providing details of the failed control test(s).

DETAILED DESCRIPTION

As discussed above, anti-virus software requires regular updates to ensure that end user computers ("client terminals") have the latest malware signatures and software enhancements to provide them with the best possible protection against malware. With the short timeframe provided for getting these updates ready for distribution, and the wide ranging computer system configurations to which the updates are to be applied, there can often be issues on client terminals that arise from "problem updates".

A method will now be described that can be used to allow an antivirus software update to be tested on a client terminal prior to the updated software being used in a "live" environment. The updated software can be tested in such a way that there will be no detrimental effect on the client terminal should the update not perform correctly. This method involves loading the updatable module in a sandbox environment and applying the update within the sandbox. A series of control tests are then carried out which are designed to check that the updated sandboxed module functions correctly. If there are any problems with the update that cause the module to function incorrectly or cause stability issues then, because of the sandbox, the rest of the machine will not be affected and there will be no adverse effects experienced by the user. The updatable module can be any updatable module within the anti-virus software, for example a part of scanning logic, a driver, a UI component etc. In this example it is described as being the anti-virus scanning engine. The term "engine" as used here covers both the executable library and signatures belonging to it.

Figure 1:
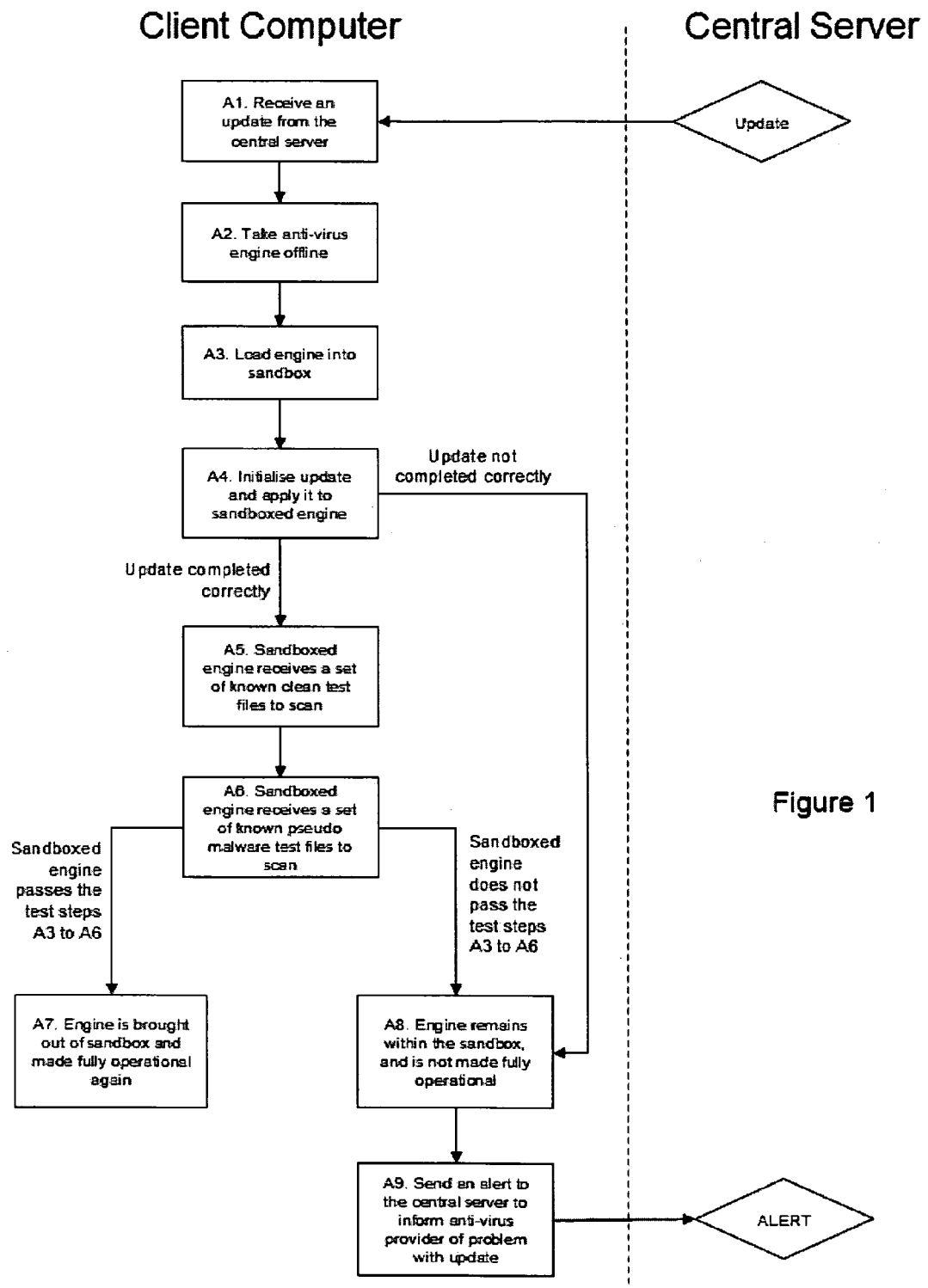
FIG. 1 is a flow diagram illustrating a method of updating anti-virus software on a client terminal according to an embodiment of the invention.

FIG. 1 is a flow diagram showing the steps of a method of updating anti-virus software on a client terminal. The steps of the method are:

A1. The client terminal receives an update from a central server via the internet
A2. The anti-virus engine is taken offline
A3. The engine is loaded into a sandbox environment
A4. The update is initialised and applied to the sandboxed engine
A5. After confirmation that the update has been completed correctly, the sandboxed engine receives a set of known clean test files to scan
A6. The sandboxed engine then receives a set of known pseudo malware files to scan
A7. If the sandboxed engine behaves correctly during the test steps A3 to A6, the engine is made operational again
A8. If the sandbox engine does not pass the test steps A3 to A6, or if it does not function correctly, the engine remains offline A9. An alert is sent from the client terminal to the central server to inform the anti-virus provider of an issue with the update.

Considering this method in more detail, in step A1, the client terminal receives an update from a central server. This update will typically be provided from a back-end server owned or otherwise controlled by the provider of the anti-virus software. The method describes the update being delivered to the client terminal via the internet, but it is possible that the update is provided by another means, for example via physical media such as a CD-ROM, DVD-ROM, flash drive or similar. On receiving the update, the anti-virus engine is taken offline in step A2. This ensures that the update is not applied to the engine within the normal working environment of the anti-virus software and that the engine does not scan any of the user's files before it has been tested.

In step A3, the engine is loaded in a sandbox environment. As will be understood by the skilled person, a "sandbox environment" is one which mimics the true (computer) operating environment, but which prevents changes being made to operating settings which might adversely affect the computer's performance, for example a sandbox environment will not be allowed to modify key system settings such as registry keys. A typical implementation of a sandbox environment will involve allocating a block of memory to the sandbox which "simulates" the true system memory.

An anti-virus scanner can be considered to consist of two modules: a scanning process (framework) and the scanning engine. The scanning process is an executable, which loads the engine. The scanning process enables integration with the operating system by determining the files to be scanned and sending corresponding scanning requests to the engine. The engine provides a scanning interface that processes scanning requests generated by the scanning process. If the engine detects malware during scanning, the scanning process blocks the file and possibly removes the malware. The sandbox environment in this context can be understood as being a pseudo scanning process. It functions in a similar way to the normal scanning process, with the sandbox loading the engine and sending scan requests to the engine. The key difference between the sandbox environment and the scanning process is that unusual or unwanted behaviour of the engine, for example crashing or hanging during scanning or detection of false positives, won't give rise to any damaging consequences for the computer system.

There are a number of ways in which the sandbox may be implemented. Three of which are:
1. The scanning process of the sandbox is carried out as a "runner" process, which allows executing scanning methods from the engine. The process receives a file path or buffer, sends a request to the engine and reports the scanning result. The "runner" sandbox is a light version of the main scanning process, which only has the functionality to load and scan with the engine and has no other logic such as hooking files.
2. The scanning process of the sandbox is a forked (or cloned) instance of the main scanning process. The main anti-virus scanning process produces a self copy and passes the updated engine path to the clone process. The "clone" sandbox initializes the engine in the same way as it would be by the main scanning process. However any results from the scanning will be ignored.
3. The scanning process of the sandbox is a reduced form of the main scanning process, known as an "embedded" sandbox. The engine is loaded normally, but while it is offline the engine is working in a "transparent mode" until its consistency is confirmed. Here, "transparent mode" means that any results from scanning won't be reported to user.

Methods 1 and 2 provide better reliability, since in case of engine crash or hang during self test the sandbox process could be simply terminated. Method 3, however, is faster and consumes fewer resources as no new process instance is created.

In step A4 the update is initialised and applied to the sandboxed engine. The sandbox can perform multiple cycles of initialisations with differing configuration parameters to ensure that the update is correctly applied under a number of different computer configurations. For example the default configuration may initialize the engine with a minimal set of features and/or with a low heuristics level, but other initialisations are also carried out with different numbers of features enabled and with different levels of scanning heuristics. If the update is not completed correctly, the method skips to steps A8 and A9 where the engine remains offline and an alert is sent to the central server to inform the anti-virus provider that there is a problem with the update. Of course, an un-updated engine may be kept online to ensure that a level of security is maintained, at the same time as sending the alert to the software provider.

If the update is completed correctly, in step A5 the sandboxed engine receives a set of known clean files to scan. In order to pass this test, the engine must not detect any of these files as being malicious. The set of files can be a selection of files including, but not limited to, operating system files, files which are part of the anti-virus software itself, previous N-scanned files, user documents, locally "fuzzed" files and predefined files. The file set can be updatable and/or can be built by the anti-virus software "on-the-fly" from existing files. Operating system files can be selected from a critical list and could be, for example, explorer.exe, winlogin.exe, svchost.exe and/or kernel32.dll. Files from the anti-virus software itself could be, for example, user-interface, help, readme files etc. For the user document files, the anti-virus software keeps track of the last created files on the machine and adds them to the set of clean files. For the previous N-scanned files, the anti-virus may keep track of the last files scanned by the anti-virus software before the update was received. This can be a predefined number of previously scanned files (for example N=100). In addition to these "static" clean files within the clean set, the anti-virus software can create locally "fuzzed" files. In order to do this, the anti-virus software takes files of popular formats, for example JPG, HTML, JS and DOC and randomizes some areas of the files. The predefined files can be stored in an archive file that contains a number of basic files. Assuming that the update installs correctly, at step A5, the sandboxed engine should scan the test files and no malware should be detected. During the scanning the anti-virus software also checks for stability issues such as crashing, hanging, CPU and/or memory spikes or other anomalous behaviour. It may also check that scanning of individual files does not exceed a defined threshold, for example 1 second.

Step A6 is similar to step A5. However, instead of a set of known clean files, the sandboxed engine is given a set of known pseudo malware files to scan. In this instance the engine should detect each of the files within the sample set. Again, as in step A5, the scanning process is monitored to check for stability issues.

If the engine behaves correctly during step A5 and A6 and detects all the correct malware files without any stability issues arising, then the test is considered as having been passed, and in step A7 the engine is brought out of the sandbox and made operational again. At this stage it can resume normal scanning of the client terminal files. If however the sandboxed engine doesn't pass the tests of steps A5 and A6, either because it identifies trusted or pseudo-malware files incorrectly or stability issues are detected, then in step A8 the sandboxed engine is kept offline. Step A8 can also be arrived at if the update was not completed correctly in step A4. In step A9, an alert is sent from the client terminal to the central server stating that an error has been detected with the latest update. This alert may include information on the type of error that has been detected. This will make the provider of the anti-virus software aware of the issue so that a new update can be produced and sent out to client terminals. This new update can then be tested again by the anti-virus by following steps A4 onwards, in the expectation that the new update will fix the engine so that it can return to operational mode.

Detection and blocking of files that have been detected as being malware can cause severe problems for the client terminal. Therefore, as an extra check to ensure the best possible system performance, the anti-virus engine performance testing procedure may be repeated when malware is detected in normal use, i.e. during "real-time" scanning. In particular, steps A3 to A7 or A9 of FIG. 1 are performed to ensure that the engine is running correctly. If the "self-test" is passed and a determination made that the scanning engine is performing correctly, then the malware detection is confirmed and appropriate action taken, e.g. the malware file(s) is(are) quarantined and/or disinfected/deleted and the user notified. If however the self-test is not passed, then this can be an indication that the detected file(s) may not in fact be malware. In this case the anti-virus application will wait until a new update is released which does pass the self-test before re-scanning the detected file and determining whether or not to report it to the user.

Figure 2:
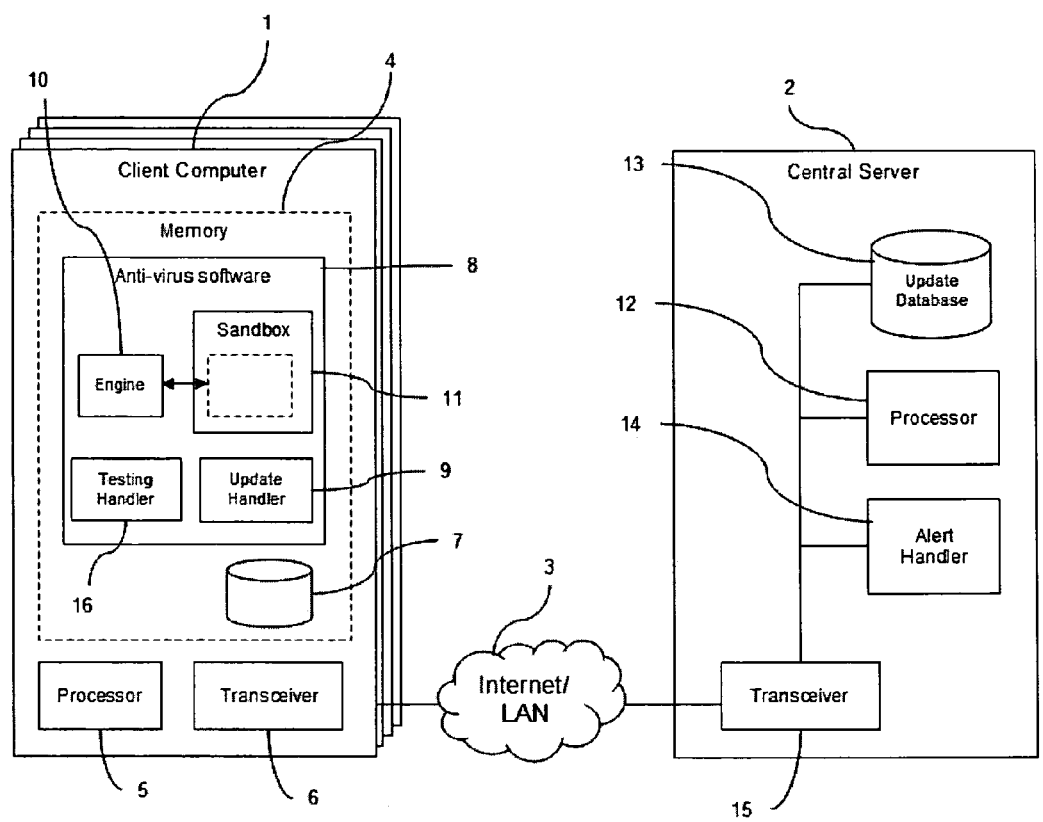
FIG. 2 illustrates schematically a computer system according to an embodiment of the present invention.

FIG. 2 illustrates schematically a computer system according to an embodiment of the present invention. The computer system comprises at least one client terminal 1 connected to a central server 2 over a network 3 such as the Internet or a LAN. The client terminal 1 can be implemented as a combination of computer hardware and software. A client terminal 1 comprises a memory 4, a processor 5 and a transceiver 6. The memory 4 stores the various programs/executable files that are implemented by the processor 5, and also provides a storage unit 7 for any required data. Anti-virus software 8 is stored on the memory 4, and contains sub units such as an update handler 9, scanning engine 10, sandbox 11, and testing handler 16 as shown in FIG. 2. The scanning engine 10 is able to be run either in or out of the sandbox 11. When an update is received by the client terminal 1, the engine 10 is taken offline and initialised within the sandbox 11. The update handler 9 will update the engine 10, and the testing handler 16 will then test the updated engine 10 to check that it is functioning correctly. The transceiver 6 is used to communicate with the central server 2 over the network 3 and can receive updates from the central server as well as send alerts back to the central server from the client terminal. Typically, the client terminals 1 may be any of a desktop personal computer (PC), laptop, personal data assistant (PDA) or mobile phone, or any other suitable device.

The central (backend) server 2 is typically run by the provider of the anti-virus software, and comprises a processor 12, a database 13 containing the updates to be sent out to the client terminals 1, an alert handler 14 and a transceiver 15. The transceiver 15 sends out updates to client terminals, and also receives any alerts that the client terminals send back to the central server regarding problems with any updates. These alerts are then passed to the alert handler 14 which allows the anti-virus provider to address the problems that have arisen in the update, and create a new improved update.

The method of updating anti-virus software proposed here allows updates to be tested on each client terminal prior to it being implemented in the normal anti-virus scanning environment. Standard "backend" testing of updates can never model each and every possible computer configuration prior to the update being made available to end users, and so problem updates can cause instability in both the anti-virus software and the client terminal as a whole. This method overcomes the previous limitations of updating anti-virus software which was reactive towards problem updates only after instability issues had been experienced by end-users, and provides an assurance to end-users that updates will only be installed on their systems once it has been tested in a sandbox that has been individually tailored to mirror their computer system.

The techniques described herein may be implemented by various means so that an apparatus/system implementing one or more functions described with an embodiment comprises not only prior art means, but also means for implementing the one or more functions of a corresponding apparatus described with an embodiment and it may comprise separate means for each separate functions. These techniques may be implemented in hardware (one or more modules) or combinations thereof. For software, implementation can be through modules, e.g. procedures, functions, and so on, that perform the functions described herein. The software codes may be stored in any suitable, processor/computer-readable data storage medium or memory unit(s) or articles(s) of manufacture and be executed by one or more processors/computers. The data storage medium or memory unit may be implemented within the processor/computer, or external to the processor/computer, in which case it can be communicatively coupled to the processor/computer via various means, as is known in the art.

The programming, such as executable code or instructions, electronic data, databases or other digital information can be stored into memories and it may include processor-usable medium. Processor-usable medium may be embodied in any computer program product or article of manufacture which can contain, store, or maintain programming, data or digital information for use by or in connection with an instruction execution system including the processor 5 in the exemplary embodiment.

In an embodiment, there is provided a computer program product comprising a computer-readable medium bearing computer program code embodied therein for use with a computer, the computer program code comprising: code for receiving an update at the client terminal, code for initialising an updatable module of an anti-virus application within a sandbox environment and applying the update to the updatable module, code for running control tests on the updated sandboxed module, code for bringing the updated module out of the sandbox environment and allowing normal scanning to proceed using the updated module when the control tests are passed, and code for preventing normal scanning using the updated module when the control tests are not passed.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

It will be appreciated by the person of skill in the art that various modifications may be made to the above described embodiments without departing from the scope of the present invention. For example, the updatable module which is described in the examples as being the scanning engine, may alternatively be part of, for example, the scanning logic, a driver or a UI component.

The invention claimed is:

1. A method of updating an anti-virus application comprising an updatable module running on a client terminal, the method comprising:
receiving an update for the updatable module of the anti-virus application at the client terminal;
initialising the updatable module within a sandbox environment and applying the update to the updatable module;
running control tests on the updated module in the sandbox environment;
if the control tests are passed, bringing the updated module out of the sandbox environment and allowing normal scanning by the anti-virus application to proceed using the updated module; and
if the control tests are not passed, preventing normal scanning using the updated module;
wherein the control tests comprise scanning a selection of known clean and/or malicious files using the anti-virus application comprising the updated module to confirm that the updated module is functioning correctly.

2. A method as claimed in claim 1, wherein the updatable module is a scanning engine.

3. A method as claimed in claim 1, wherein the sandbox environment is a sandboxed instance of a scanning process of the anti-virus application.

4. A method as claimed in claim 3, wherein the sandboxed instance of the scanning process is implemented as a runner process with reduced functionality.

5. A method as claimed in claim 3, wherein the sandboxed instance of the scanning process is implemented as a forked, or cloned, instance of the main scanning process, but with disabled functionality.

6. A method as claimed in claim 3, wherein the sandboxed instance of the scanning process is a reduced form of the main scanning process where the engine is run in a transparent mode.

7. A method as claimed in claim 1, wherein the sandboxed module is made to perform multiple cycles of initializations with different configuration parameters.

8. A method as claimed in claim 1, wherein the selection of known clean and/or malicious files comprises one or more of operating system files, anti-virus application files, previous N-scanned files, user documents, locally fuzzed files and predefined files.

9. A method as claimed in claim 1, wherein a control test includes checking that standard module processes do not cause an application or system crash.

10. A method as claimed in claim 1, wherein a control test includes checking that standard module processes do not cause CPU and/or memory spikes.

11. A method as claimed in claim 1, wherein, if the control tests are not passed, an alert is sent from the client terminal to a server of an anti-virus application provider, the alert providing details of the failed control test(s).

12. A method of scanning a client terminal for malware using an anti-virus application comprising an updated module, the method comprising:
scanning the client terminal for potential malware; and
upon detection of potential malware
initialising the updated module within a sandbox environment;
running control tests on the sandboxed updated module;
if the control tests are passed, confirming the detection of the potential malware; and
if the control tests are not passed, either rejecting the detection or performing further tests on the potential malware;
wherein the control tests comprise scanning a selection of known clean and/or malicious files using the anti-virus application comprising the updated module to confirm that the updated module is functioning correctly.

13. A client terminal comprising:
a scanning engine for detecting malware on the client terminal;
an update handler for receiving updates for the scanning engine;
a sandbox environment in which the scanning engine can be initialised when it is to be updated; and
a testing handler for testing that the updated scanning engine functions correctly within the sandbox environment;
wherein said testing handler is configured to test the updated scanning engine using known clean and/or malware files.

14. A computer program product comprising a non-transitory computer-readable medium bearing computer program code embodied therein for use with a computer, the computer program code comprising:
code for receiving an update at the client terminal;
code for initialising an updatable module of an anti-virus application within a sandbox environment and applying the update to the updatable module;
code for running control tests on the updated sandboxed module;
code for bringing the updated module out of the sandbox environment and allowing normal scanning to proceed using the updated module when the control tests are passed; and
code for preventing normal scanning using the updated module when the control tests are not passed;
wherein the control tests comprise scanning a selection of known clean and/or malicious files using the anti-virus application comprising the updated module to confirm that the updated module is functioning correctly.

15. A computer program product as claimed in claim 14, wherein the sandbox environment is a sandboxed instance of a scanning process of the anti-virus application and the computer program code further comprises: code for implementing the sandboxed instance of the scanning process in at least one of the following ways: as a runner process with reduced functionality; as a forked, or cloned, instance of the main scanning process, but with disabled functionality; as a reduced form of the main scanning process where the engine is run in a transparent mode.

16. A computer program product as claimed in claim 14, wherein the computer program product further comprises code for performing multiple cycles of initializations of the sandboxed module with different configuration parameters.

17. A computer program product as claimed in claim 14, wherein the code for running control tests runs control tests comprising at least one of the following: checking that standard module processes do not cause an application or system crash; checking that standard module processes do not cause CPU and/or memory spikes.

18. A computer program product as claimed in claim 14, wherein the computer program product further comprises code for sending an alert from the client terminal to a server of an anti-virus application provider if the control tests are not passed, the alert providing details of the failed control test(s).

* * * * *